US012521770B2

(12) United States Patent
Takahashi et al.

(10) Patent No.: US 12,521,770 B2
(45) Date of Patent: Jan. 13, 2026

(54) ABATEMENT DEVICE, DEPOSITED MATERIAL REMOVING MEANS, AND DEPOSITED MATERIAL REMOVING METHOD

(71) Applicant: Edwards Japan Limited, Chiba (JP)

(72) Inventors: Katsunori Takahashi, Chiba (JP); Masahiro Tanaka, Chiba (JP); Jinquan Guan, Chiba (JP)

(73) Assignee: Edwards Japan Limited, Chiba (JP)

( * ) Notice: Subject to any disclaimer, the term of this patent is extended or adjusted under 35 U.S.C. 154(b) by 45 days.

(21) Appl. No.: 18/683,687

(22) PCT Filed: Sep. 2, 2022

(86) PCT No.: PCT/JP2022/033168

§ 371 (c)(1),
(2) Date: Feb. 14, 2024

(87) PCT Pub. No.: WO2023/042694

PCT Pub. Date: Mar. 23, 2023

(65) Prior Publication Data

US 2024/0367201 A1 Nov. 7, 2024

(30) Foreign Application Priority Data

Sep. 17, 2021 (JP) ................................ 2021-152247

(51) Int. Cl.
*B08B 3/02* (2006.01)
*B08B 13/00* (2006.01)

(52) U.S. Cl.
CPC ................ *B08B 3/02* (2013.01); *B08B 13/00* (2013.01)

(58) Field of Classification Search
CPC ...................................................... B08B 3/02
See application file for complete search history.

(56) References Cited

U.S. PATENT DOCUMENTS

2014/0308187 A1 10/2014 Messineo et al.

FOREIGN PATENT DOCUMENTS

| | | | |
|---|---|---|---|
| EP | 0159128 | A1 | 10/1985 |
| GB | 2504335 | A | 1/2014 |
| JP | H0352616 | A | 3/1991 |
| JP | 2006007124 | A | 1/2006 |
| JP | 2007263554 | A | 10/2007 |
| JP | 2020037075 | A | 3/2020 |

(Continued)

OTHER PUBLICATIONS

European Communication dated Jun. 16, 2025 and Supplementary Search Report dated May 30, 2025 for corresponding European application Serial No. EP22869841, 6 pages.

(Continued)

*Primary Examiner* — Jason Y Ko
(74) *Attorney, Agent, or Firm* — Theodore M. Magee; Westman, Champlin & Koehler, P.A.

(57) ABSTRACT

In order to efficiently remove deposited material adhering to the interior of an abatement device, an abatement device is equipped with a deposited material removing means for removing deposited material produced during abatement of exhaust gas. The deposited material removing means includes: a storage unit that stores a liquid; a gas supply unit that supplies pressurized gas to the storage unit; and a valve that sprays a mixed fluid of the liquid stored in the storage unit and the gas supplied by the gas supply unit.

7 Claims, 4 Drawing Sheets

(56) References Cited

FOREIGN PATENT DOCUMENTS

| | | | |
|---|---|---|---|
| JP | 2020067223 | A | 4/2020 |
| JP | 6777472 | B2 | 10/2020 |
| WO | 9806977 | A1 | 2/1998 |

OTHER PUBLICATIONS

PCT International Search Report dated Nov. 29, 2022 for corresponding PCT application Serial No. PCT/JP2022/033168, 2 pages.
PCT International Written Opinion dated Nov. 29, 2022 for corresponding PCT application Serial No. PCT/JP2022/033168, 3 pages.

[Fig. 1]
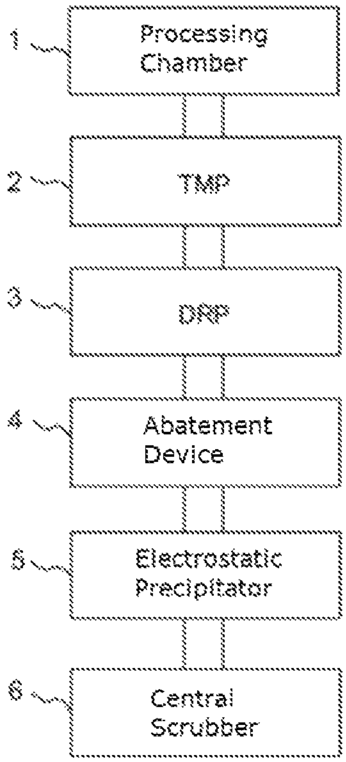

[Fig. 2]
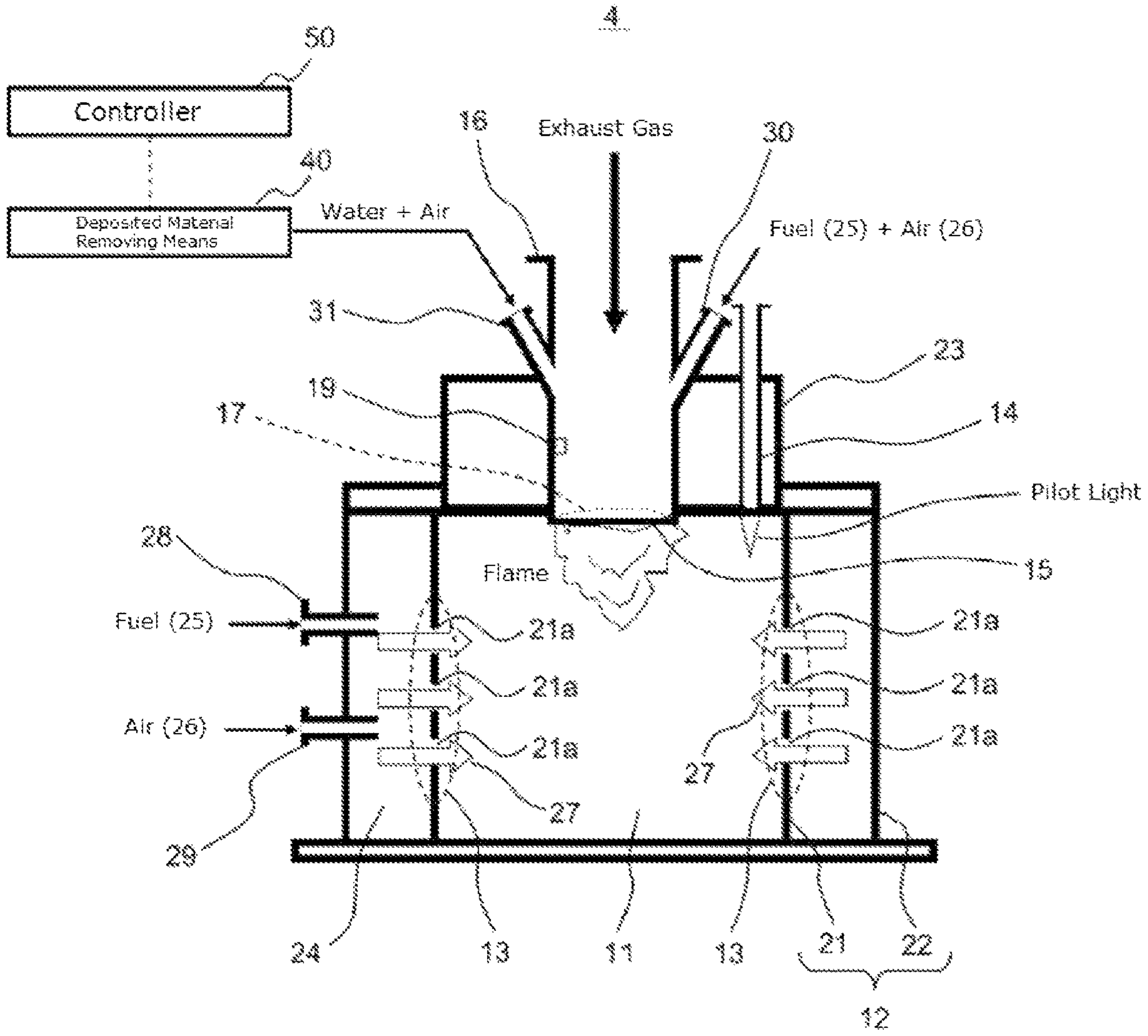

[Fig. 3]
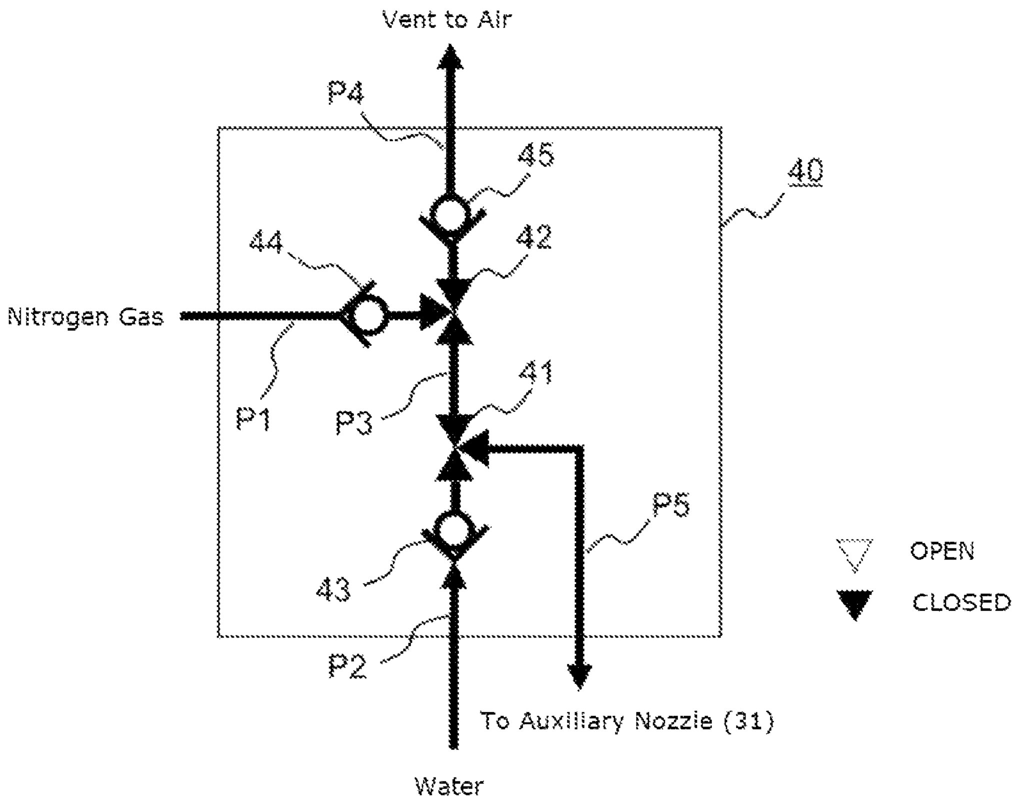

[Fig. 4]
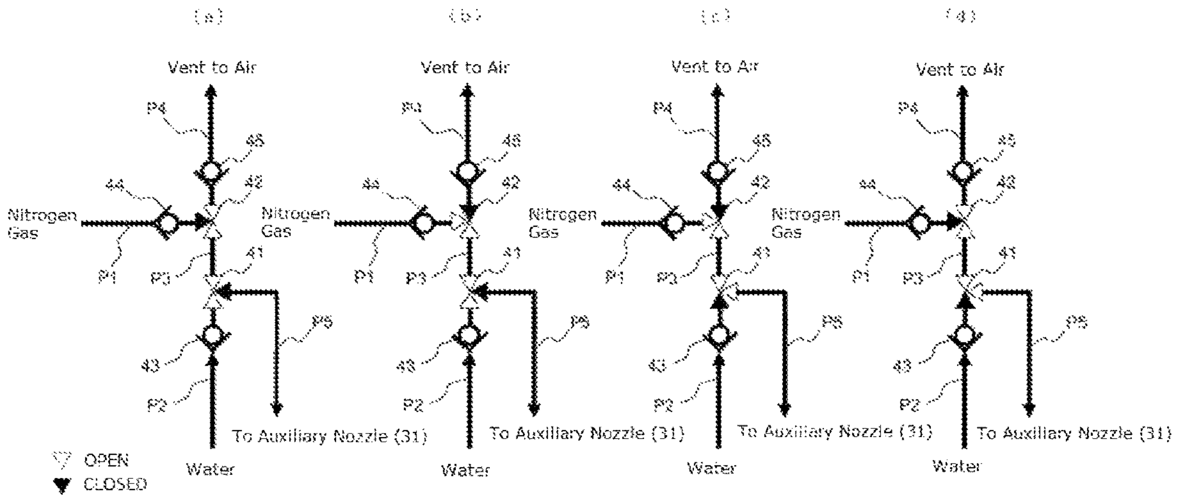

ABATEMENT DEVICE, DEPOSITED MATERIAL REMOVING MEANS, AND DEPOSITED MATERIAL REMOVING METHOD

CROSS-REFERENCE OF RELATED APPLICATION

This application is a Section 371 National Stage Application of International Application No. PCT/JP2022/033168, filed Sep. 2, 2022, which is incorporated by reference in its entirety and published as WO 2023/042694A1 on Mar. 3, 2023 and which claims priority of Japanese Application No. 2021-152247, filed Sep. 17, 2021.

FIELD

The present invention relates to an abatement device, a deposited material removing means for removing deposited material that has been deposited in the abatement device, and a deposited material removing method for removing deposited material that has been deposited in the abatement device.

BACKGROUND

Because exhaust gases discharged from semiconductor manufacturing equipment contain harmful components, the exhaust gases have to be abated by an abatement device. When exhaust gases are oxidized, oxides are deposited in the abatement device. Therefore, this deposited material has to be periodically removed.

The discussion above is merely provided for general background information and is not intended to be used as an aid in determining the scope of the claimed subject matter. The claimed subject matter is not limited to implementations that solve any or all disadvantages noted in the background.

SUMMARY

It is an object of the present invention to efficiently remove deposited material adhering to the interior of an abatement device.

In order to achieve this object, one aspect of the present invention is an abatement device equipped with a deposited material removing means for removing deposited material produced during abatement of exhaust gas, in which the deposited material removing means includes a storage unit that stores a liquid, a gas supply unit that supplies pressurized gas to the storage unit, and a valve that sprays a mixed fluid of the liquid stored in the storage unit and the gas supplied by the gas supply unit.

This configuration preferably includes a pressure sensor that detects the pressure at the inlet for the exhaust gas, and a control unit that controls the opening and closing operation of the valve, in which the control unit opens the valve when the pressure at the inlet exceeds a threshold value.

In this configuration, the control unit preferably keeps the valve open for a predetermined period of time after the valve has been opened.

In this configuration, the predetermined period of time is preferably a period of time exceeding the time at which all of the liquid stored in the storage unit has been sprayed.

In this configuration, the control unit preferably keeps the valve closed while the abatement device is abating the exhaust gas.

In order to achieve the object of the present invention, another aspect of the present invention is a deposited material removing means, applied to an abatement device for abating exhaust gas, for removing deposited material produced during abatement of exhaust gas, in which the deposited material removing means includes a storage unit that stores a liquid, a gas supply unit that supplies pressurized gas to the storage unit, and a valve that sprays a mixed fluid of the liquid stored in the storage unit and the gas supplied by the gas supply unit.

In order to achieve the object of the present invention, another aspect of the present invention is a deposited material removing method for removing deposited material produced by an abatement device for abating exhaust gas, the method including a first step of storing a liquid, a second step of supplying pressurized gas to the liquid stored in the first step, and a third step of spraying the mixed fluid of the liquid and the gas produced in the second step on the deposited material to remove the deposited material.

The present invention is able to efficiently remove deposited material adhering to the interior of an abatement device. Other issues, configurations, and effects will be clarified in the description of the embodiments that follow.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF DRAWINGS

FIG. 1 is a diagram showing the overall configuration of an exhaust gas treating system using the present invention.

FIG. 2 is a diagram showing the configuration of the abatement device in an embodiment of the present invention in greater detail.

FIG. 3 is a diagram showing the configuration of the deposited material removing means in FIG. 2.

FIG. 4 (*a*) to (*d*) are diagrams showing the order in which the deposited material removing means performs operations.

DETAILED DESCRIPTION

The following is a description of embodiments of the present invention with reference to the drawings.

FIG. 1 is a diagram showing the overall configuration of an exhaust gas treating system using the present invention. The exhaust gas treating system in FIG. 1 is used to detoxify exhaust gases (process gas, cleaning gas) discharged from a processing chamber 1 in manufacturing equipment such as semiconductor manufacturing equipment, flat panel display manufacturing equipment, or solar panel manufacturing equipment.

Chemical vapor deposition (CVD) to form film using a chemical vapor phase reaction and etching (referred to below collectively as the processing operations) are performed inside the processing chamber 1, and various types of gases are used in the processing chamber 1. These gases include silane (SiH4), NH3 and H2, which are gases used to form film on semiconductor devices, liquid crystal panels and solar cells, gaseous fluorides such as NF3, CF4, C2F6, SF6, CHF3, CF6, which are used as cleaning gases when, for example, cleaning the interior of a processing chamber in a plasma CVD device with plasma, and inert gases such as nitrogen gas (N2).

A vacuum pump such as a turbo molecular pump (TMP) 2 is connected to the processing chamber 1 and a dry pump (DRP) 3 is connected in series to the turbo molecular pump 2 downstream from turbo molecular pump 2 to evacuate and remove these harmful exhaust gases. When removing the exhaust gas from the processing chamber 1, the dry pump 3 is used at the start of operations to evacuate the chamber to some extent, and then the turbo molecular pump 2 is used evacuate the chamber to the required low pressure. A rotary pump may be used instead of the dry pump 3, and the dry pump 3 can be omitted depending on the specifications for the exhaust gas treating system.

The harmful exhaust gases discharged from the processing chamber 1 via the turbo molecular pump 2 and the dry pump 3 are incinerated and broken down by the abatement device 4 and electrostatically collected by an electrostatic precipitator 5 before reaching a central scrubber 6. At this time, the exhaust gases are guided through the abatement device 4 and the electrostatic precipitator 5 while being slightly depressurized by the central scrubber 6. The abatement device 4 and the electrostatic precipitator 5 are sometimes configured as a single device.

The abatement device 4 among the devices constituting this exhaust gas treating system will now be described. Because the configurations of the other devices are known in the art, a detailed explanation of them has been omitted. FIG. 2 is a diagram showing the configuration of the abatement device 4 in an embodiment of the present invention in greater detail. The abatement device 4 in FIG. 2 is a combustion-type abatement device that detoxifies exhaust gases containing harmful components by combustion and pyrolysis.

The abatement device 4 has a main unit 12 equipped with a combustion chamber 11 for receiving exhaust gases, an inlet nozzle 16 from a gas passage for introducing exhaust gases into the combustion chamber 11, a main burner 13 that forms a flame on one side of the combustion chamber 11, a sub-burner 15 that forms a flame near the outlet from the inlet nozzle 16, a pilot burner 14 that forms the pilot flame needed to ignite the main burner 13 and the sub-burner 15, a deposited material removing means 40 (see FIG. 3) for removing deposited material 17 such as silica ($SiO_2$) deposited near the outlet from the inlet nozzle 16, a pressure sensor 19 provided in the inlet nozzle 16 that detects the pressure of the introduced exhaust gases, and a controller 50 that controls the abatement device 4.

The main unit 12 has a first cylindrical wall 21 with a substantially cylindrical shape and a second cylindrical wall 22 with a substantially cylindrical shape installed to the outside the first cylindrical wall 21. The upper surfaces of the first cylindrical wall 21 and the second cylindrical wall 22 are closed by the inlet head 23, and the lower surfaces are closed by a bottom wall (not shown). The interior space of the first cylindrical wall 21 is the combustion chamber 11, and the annular space between the first cylindrical wall 21 and the second cylindrical wall 22 is the burner gas chamber 24 receiving combustible fuel 25 and air 26. The first cylindrical wall 21 and the second cylindrical wall 22 do not have to be cylindrical.

The main burner 13 is provided in the burner gas chamber 24. The main burner 13 discharges a mixed fluid 27 of combustible fuel 25 and air 26 toward the combustion chamber 11 via a plurality of holes 21*a* provided in the first cylindrical wall 21. Therefore, the second cylindrical wall 22 is provided with a first flammable gas supply nozzle 28 which supplies combustible fuel 25 to the burner gas chamber 24, and a second flammable gas supply nozzle 29 that supplies air 26 to the burner gas chamber 24.

The sub-burner 15 is provided on the inlet head 23. More specifically, the sub-burner 15 is provided near the outlet from the inlet nozzle 16. A third flammable gas supply nozzle 30 is provided in the middle of the inlet nozzle 16, and combustible fuel 25 and oxygen (or air 26) are supplied from the third flammable gas supply nozzle 30 to the inlet nozzle 16. The sub-burner 15 discharges a mixed fluid of combustible fuel 25 and oxygen (or air 26) toward the combustion chamber 11 to burn the exhaust gases. In the present embodiment, the sub-burner 15 burns at a higher temperature than the main burner 13 in order to effectively detoxify certain gases (for example, $CF_4$).

The inlet nozzle 16 is provided with an auxiliary nozzle 31 through which a mixed fluid of water and nitrogen gas sprayed from the deposited material removing means 40 (described below) flows. The auxiliary nozzle 31 is attached to the inlet nozzle 16 at an angle so that the mixed fluid sprayed from the auxiliary nozzle 31 strikes near the center of the deposited material 17.

The pilot burner 14 is provided on the inlet head 23. The pilot burner 14 discharges a mixed fluid of combustible fuel 25 and air 26 (or oxygen) from the upper surface of the combustion chamber 11 toward the interior of the combustion chamber 11 to produce a pilot flame.

Film-like deposited material 17 is deposited in the abatement device 4 near the outlet from the inlet nozzle 16 while abatement treatment is being performed. In order to remove this deposited material 17, the abatement device 4 is provided with a deposited material removing means 40.

FIG. 3 is a diagram showing the configuration of the deposited material removing means 40 in FIG. 2. As shown in FIG. 3, the deposited material removing means 40 is equipped with nitrogen gas piping P1 through which nitrogen gas flows serving as a gas supply unit, water piping P2 through which water flows, storage piping P3 serving a as a storage unit for storing a mixed fluid of water and nitrogen gas, vent piping P4, injection piping P5 for spraying the mixed fluid toward the auxiliary nozzle 31 in the abatement device 4, check valves 43, 44, 45, and three-way valves 41, 42. Opening and closing of the three-way valves 41, 42 is controlled by the controller 50 (see FIG. 2).

Nitrogen gas is supplied to the nitrogen gas piping P1 at a pressure of, for example, 0.6 MPa, and is stored in the storage piping P3. Water is supplied to the water piping P2 at a pressure of, for example, 0.3 MPa, and is stored in the storage piping P3. The mixed fluid of water and nitrogen gas stored in the storage piping P3 flows through the injection piping P5 and is sprayed into the combustion chamber 11 via the auxiliary nozzle 31. The air in the storage piping P3 is vented into the atmosphere via the vent piping P4.

Here, the nitrogen gas and water do not have to be adjusted to the pressure mentioned above in order to be supplied to the deposited material removing means 40. Nitrogen gas and water can be provided from permanent supply sources in the plant where the abatement device 4 is installed. In other words, the nitrogen gas and water do not have to be specially pressurized or depressurized for the abatement device 4.

The volume of water to be stored in the present embodiment can be as low as several cubic centimeters. In this way, the storage piping P3 can serve as a storage unit.

While not shown in the drawings, the controller 50 is composed of hardware including a CPU that performs various operations, storage devices such as a ROM and an HDD that store programs used by the CPU to perform computations, a RAM that is the work area used by the CPU to execute programs, and a communication interface that is an interface for exchanging data with other devices, as well as software stored in the storage devices and executed by the CPU. The various functions of the controller 50 are realized by the CPU which loads the various programs stored in the storage devices into RAM and executes them.

The following is an explanation of the operations performed by the deposited material removing means 40, that is, the method performed by the deposited material removing means 40 to remove deposited material 17. FIG. 4 (*a*) to (*d*) are diagrams showing the order in which the deposited material removing means 40 performs operations. In these diagrams, a black port for the three-way valves 41, 42 indicates the valve is closed, and a white port indicates the valve is open.

When processing is not being performed and the pressure detected by the pressure sensor 19 exceeds a predetermined threshold value, the controller 50 determines that the start conditions for the deposited material removing means 40 have been met, and starts operation of the deposited material removing means 40. Here, the controller 50 determines whether or not processing is being performed based on processing signals received from the processing chamber 1.

When processing is being performed or the pressure detected by the pressure sensor 19 is equal to or less than the threshold value, the controller 50 stops operation of the deposited material removing means 40. In other words, the controller 50 does not spray the mixed fluid from the deposited material removing means 40 while the abatement device 4 is abating exhaust gases. The threshold value is set in advance to a value believed to indicate that the pressure inside the inlet nozzle 16 has increased and that deposited material 17 is being formed.

When the start conditions mentioned above have been met, the controller 50 first activates three-way valve 41 and three-way valve 42 as shown in FIG. 4 (*a*). This closes off communication between the nitrogen gas piping P1 and the storage piping P3, closes off communication between the storage piping P3 and the injection piping P5, and opens communication between water piping P2, the storage piping P3, and the vent piping P4. As a result, water flows in order through the water piping P2, storage piping P3, and vent piping P4, and the air inside the storage piping P3 is released into the atmosphere.

Next, the controller 50 activates three-way valve 41 and three-way valve 42 as shown in FIG. 4 (*b*). This opens communication between the nitrogen gas piping P1 and the storage piping P3, opens communication between the water piping P2 and the storage piping P3, closes off communication between the storage piping P3 and the vent piping P4, and closes off communication between the storage piping P3 and the injection piping P5. As a result, the mixed fluid of pressurized nitrogen gas and water is stored in the storage piping P3 (first step, second step).

Next, the controller 50 activates three-way valve 41 and three-way valve 42 as shown in FIG. 4 (*c*). This closes off communication between the nitrogen gas piping P1 and the storage piping P3, closes off communication between the water piping P2 and the storage piping P3, closes off communication between the storage piping P3 and the vent piping P4, and opens communication between the storage piping P3 and the injection piping P5. As a result, the mixed fluid of nitrogen gas and water stored in the storage piping P3 flows through the injection piping P5. The mixed fluid of nitrogen gas and water flowing through the injection piping P5 is sprayed via the auxiliary nozzle 31 toward the deposited material 17 built up near the outlet from the inlet nozzle 16 (third step).

At this time, the deposited material 17 undergoes a sharp temperature change due to the water sprayed in the form of water droplets, and cracks develop due to the state change on the surface. The deposited material 17 is then broken up and removed by the impact of the pressurized nitrogen gas. In the present embodiment, the controller 50 maintains the state shown in FIG. 4 (*c*) for a predetermined period of time. More specifically, this state is maintained so that nitrogen gas is jetted for a while after all of the water stored in the storage piping P3 has been discharged. In this way, the broken up deposited material 17 can be more reliably removed by the pressurized nitrogen gas. Here, the predetermined period of time is, for example, 5 seconds, but this period of time may be determined based on the volume of the storage piping P3 for storing water and nitrogen gas.

Maintaining a state in which nitrogen gas is jetted for a while after all of the water stored in the storage piping P3 has been discharged also keeps water from remaining inside the auxiliary nozzle 31, especially near the outlet. Because water droplets inside the auxiliary nozzle 31 are blown away by the nitrogen gas, buildup of deposited material 31 inside the auxiliary nozzle 31 can also be prevented.

Next, the controller 50 activates three-way valve 41 and three-way valve 42 as shown in FIG. 4 (*d*). This closes off communication between the nitrogen gas piping P1 and the storage piping P3, closes off communication between the water piping P2 and the storage piping P3, opens communication between the storage piping P3 and the vent piping P4, and opens communication between the storage piping P3 and the injection piping P5. As a result, any nitrogen gas lingering inside the storage piping P3 is released via the vent piping P4 into the atmosphere.

In this way, when the pressure inside the inlet nozzle 16 exceeds the threshold value while processing is not being performed, the controller 50 determines that there has been buildup of deposited material 17 and removes the deposited material 17 by having the deposited material removing means 40 perform the operations in FIG. 4 (*a*) to (*d*). The controller 50 repeats these operations every time the start conditions are met.

The following actions and effects can be realized by an abatement device 4 with the configuration described above.

By spraying nitrogen gas containing water droplets on the deposited material 17, the deposited material 17 is subjected to a steep temperature change. As a result, cracks develop in the deposited material 17. By spraying pressurized nitrogen gas containing water droplets onto the deposited material 17, the impact force is increased relative to nitrogen gas alone, and the cracked deposited material 17 can be broken up and removed. Because a sharp temperature change is used to develop cracks in the deposited material 17, only a small amount of water (water droplets) has to be sprayed onto the deposited material 17. In other words, the deposited material is broken up not by the impact force from a large volume of water, but by a small amount of water sprayed onto deposited material 17 at a high temperature (for example, about 800 to 900° C.).

In the present embodiment, because a mixed fluid of water and nitrogen gas can be produced using the permanent nitrogen gas system installed in a plant, the pressure of the water does not have to be increased using, for example, a pressure pump. Therefore, the abatement device 4 does not require special equipment.

Deposited material that has built up in portions that cannot be scraped off by the scraper can be efficiently removed in the present embodiment, and no scraper is required to scrape off deposited material 17. Of course, the deposited material removing means 40 in the present embodiment can be combined with a scraper to remove deposited material 17 even more effectively.

Because the controller 50 operates the deposited material removing means 40 when it has determined that processing is not being performed, the abatement processing performed by the abatement device 4 is not adversely affected. Because nitrogen gas flows into the abatement device 4 even when processing is not being performed, the pressure sensor 19 can detect an increase in pressure inside the inlet nozzle 16 when deposited material 17 has been produced. Therefore, deposited material 17 can be efficiently removed even though the deposited material removing means 40 only operates when processing is not being performed.

Even though the amount of water used to remove deposited material 17 is a low several cubic centimeters, the temperature change affected by the water for the purpose of removing deposited material has a sufficient effect and operation of the abatement device 4 is not adversely affected. More specifically, because a low amount of water is sprayed into the abatement device 4, it evaporates immediately after the deposited material 17 has been removed. Even when water droplets remain in the abatement device 4, they do not change the temperature inside the combustion chamber 11. In this way, deposited material 17 can be effectively removed without causing a decline in the abatement performance of the abatement device 4.

The present invention is not limited to the embodiment described above, and several modifications and combinations can be realized without departing from the scope and spirit of the present invention. All technical matters included in the technical concept described in the claims are the subject of the present invention. The embodiment described above is a preferred example, and those skilled in the art can realize alternative examples, modified examples, amended examples, combined examples, and improved examples from the information disclosed in the present specification. These examples fall within the technical scope described in the appended claims.

For example, the abatement device 4 does not have to be the combustion-type device mentioned above but can be a plasma-type device or some other type of device. In the case of a plasma-type abatement device, the power consumed by the plasma generator can be reduced.

Also, the device may have the same configuration as above except for using two-way valves instead of three-way valve 41 and three-way valve 42.

Also, plant air or some other gas supply permanently installed in the plant may be used instead of nitrogen gas. Similarly, a liquid antifreeze or some other liquid may be used instead of water. The mixed fluid used here can depend on the type of available gas used for purposes other than those of the abatement device 4 and the usage environment.

Depending on the amount of water to be stored, a storage tank may be used instead of the storage piping P3.

The deposited material removing means 40 can be operated manually to spray the mixed fluid of nitrogen gas and water onto the deposited material 17 instead of using a controller 50.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. An abatement device equipped with a deposited material removing means for removing deposited material produced during abatement of exhaust gas, wherein the deposited material removing means comprises:

a storage unit that stores a liquid;

a gas supply unit that supplies pressurized gas to the storage unit; and a valve that sprays a mixed fluid of the liquid stored in the storage unit and the gas supplied by the gas supply unit.

2. The abatement device according to claim 1, further comprising:

a pressure sensor that detects the pressure at the inlet for the exhaust gas; and a control unit that controls the opening and closing operation of the valve, wherein the control unit opens the valve when the pressure at the inlet exceeds a threshold value.

3. The abatement device according to claim 2, wherein the control unit keeps the valve open for a predetermined period of time after the valve has been opened.

4. The abatement device according to claim 3, wherein the predetermined period of time is a period of time exceeding the time at which all of the liquid stored in the storage unit has been sprayed.

5. The abatement device according to claim 2, wherein the control unit keeps the valve closed while the abatement device is abating the exhaust gas.

6. A deposited material removing means, applied to an abatement device for abating exhaust gas, for removing deposited material produced during abatement of exhaust gas, wherein the deposited material removing means comprises:

a storage unit that stores a liquid;

a gas supply unit that supplies pressurized gas to the storage unit; and a valve that sprays a mixed fluid of the liquid stored in the storage unit and the gas supplied by the gas supply unit.

7. A deposited material removing method for removing deposited material produced by an abatement device for abating exhaust gas, the method comprising:

a first step of storing a liquid;

a second step of supplying pressurized gas to the liquid stored in the first step; and a third step of spraying the mixed fluid of the liquid and the gas produced in the second step on the deposited material to remove the deposited material.

* * * * *